(12) United States Patent
Goel

(10) Patent No.: US 7,149,426 B2
(45) Date of Patent: Dec. 12, 2006

(54) OPTICAL ROUTERS AND REDUNDANCY

(75) Inventor: Vibha Goel, Saratoga, CA (US)

(73) Assignee: Avanex Corporation, Fremont, CA (US)

( * ) Notice: Subject to any disclaimer, the term of this patent is extended or adjusted under 35 U.S.C. 154(b) by 715 days.

(21) Appl. No.: 10/012,207

(22) Filed: Nov. 5, 2001

(65) Prior Publication Data

US 2002/0186700 A1    Dec. 12, 2002

Related U.S. Application Data

(60) Provisional application No. 60/245,818, filed on Nov. 3, 2000, provisional application No. 60/246,683, filed on Nov. 7, 2000.

(51) Int. Cl.
*H04B 10/08* (2006.01)
*H04J 14/00* (2006.01)

(52) U.S. Cl. ............... 398/45; 398/12; 398/19

(58) Field of Classification Search ............ 398/1, 398/7, 10, 12, 17, 19, 33, 45; 370/218, 219, 370/220

See application file for complete search history.

(56) References Cited

U.S. PATENT DOCUMENTS

| | | | | |
|---|---|---|---|---|
| 5,303,078 A | | 4/1994 | Brackett et al. | 359/139 |
| 5,317,439 A | | 5/1994 | Fatehi et al. | 359/110 |
| 5,457,556 A | | 10/1995 | Shiragaki | 359/117 |
| 5,663,820 A | * | 9/1997 | Shiragaki | 398/50 |
| 5,729,548 A | * | 3/1998 | Holender | 370/474 |
| 5,751,868 A | | 5/1998 | Bala et al. | 385/16 |
| 6,493,119 B1 | * | 12/2002 | Kuo et al. | 398/49 |
| 6,530,032 B1 | * | 3/2003 | Shew et al. | 714/4 |
| 6,600,581 B1 | * | 7/2003 | Fatehi et al. | 398/9 |
| 6,894,970 B1 | * | 5/2005 | McDermott et al. | 370/220 |
| 2002/0063916 A1 | * | 5/2002 | Chiu et al. | 359/110 |

* cited by examiner

*Primary Examiner*—M. R. Sedighian
(74) *Attorney, Agent, or Firm*—Patterson & Sheridan, LLP

(57) ABSTRACT

An all optical switching system which is optically switched, from the signal channel all the way to a router. Errors in the routers are detected, and indications of those errors are sent back to the optical switch. The optical switch uses a system which picks off a piece of the signal to use the control signal to control the switching.

19 Claims, 2 Drawing Sheets

OPTICAL ROUTERS AND REDUNDANCY

CROSS-REFERENCE TO RELATED APPLICATIONS

This application claims priority from provisional application No. 60/245,818 filed Nov. 3, 2000 and provisional application No. 60/246,683 filed Nov. 7, 2000.

BACKGROUND

This application relates to routing of optical signals in communication systems.

Routing of signals, and specifically optical signals, allows the signals to be properly sent from an origin to a destination. Because of the importance of reliability during such communication, many such systems include multiple levels of backup. This may be especially true in high-end routers, which may require double layers of redundancy. This redundancy, may, in turn, increase significantly the cost of such a router.

SUMMARY

The present application teaches a traffic restoration and management system which may provide redundancy in the system, in a less expensive way.

BRIEF DESCRIPTION OF THE DRAWINGS

These and other aspects will now be described in detail with reference to the accompanying drawings, wherein.

DETAILED DESCRIPTION

Figure 1:
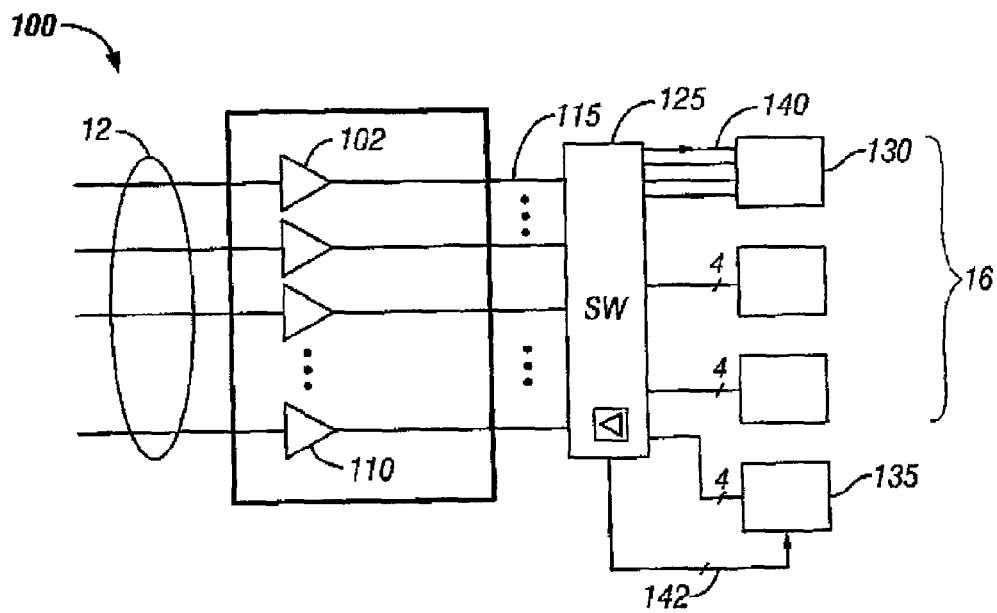
FIG. 1 shows a block diagram of the basic electronic system.

A first embodiment is shown in FIG. 1. The FIG. 1 embodiment may represent a building block of the basic system. A number of signals, here 12 optical signals, are input as 100. The optical signals are each input to optical receivers, such as the receiver shown as 102. These receivers receive the optical signal, and convert the optical signal into the electrical domain. Since there are twelve such signals, there may be twelve such receivers shown as 102 . . . 110. The output signal 115 is an electrical signal corresponding to the respective optical input signal. The twelve electrical signals 115 . . . 120 are connected to a switching matrix 125 which may be a multiplexer, for example. The switching matrix 125 receives twelve inputs on its left side, and has 16 outputs on its right side. Notably, the switching matrix 125 has the capability of switching any of the input signals to any output signal location. Each of the 16 outputs is connected to a router. Conventional routers may handle four inputs, as shown. Therefore, each router 130 . . . 135 is shown receiving four inputs. There may be four basic routers to carry out the operations for switching for all of the 16 inputs. Each of the lines 140 between the switching matrix 125 and the router 130 carries signals to the router, but also carries control information from the router. The control information shown as 142 may include various kinds of information including the so-called K1, K2 bits.

The K1, K2 bits may inform the multiplexer switch 125 that there is a failure in the router 130, e.g. in a specified channel of the router. However, since there are four extra channels on the right side of the multiplexer 125, the multiplexer 125 may then switch the incoming channels to one or more of the redundancy channels. So long as not more than four channels are indicated as failed by the K1, K2 bits, the redundancy will fully handle this problem.

The system shown in FIG. 1 may be highly advantageous, since it may reroute any input signal to the other outputs. Moreover, because of the high-speed operation, this rerouting may occur within a short time, e.g., 50 milliseconds or so, to achieve a high speed operation.

However, a disadvantage of this system is that this requires complex switching units within the optical switch 125. For example, any input such as 115 may be required to switch to any of the different outputs. This may require a very complex electrical switching network. Moreover, individual transceivers may be required which may also increase the cost of the system. The present system recognizes that this solution may be an extremely expensive solution.

Figure 2:
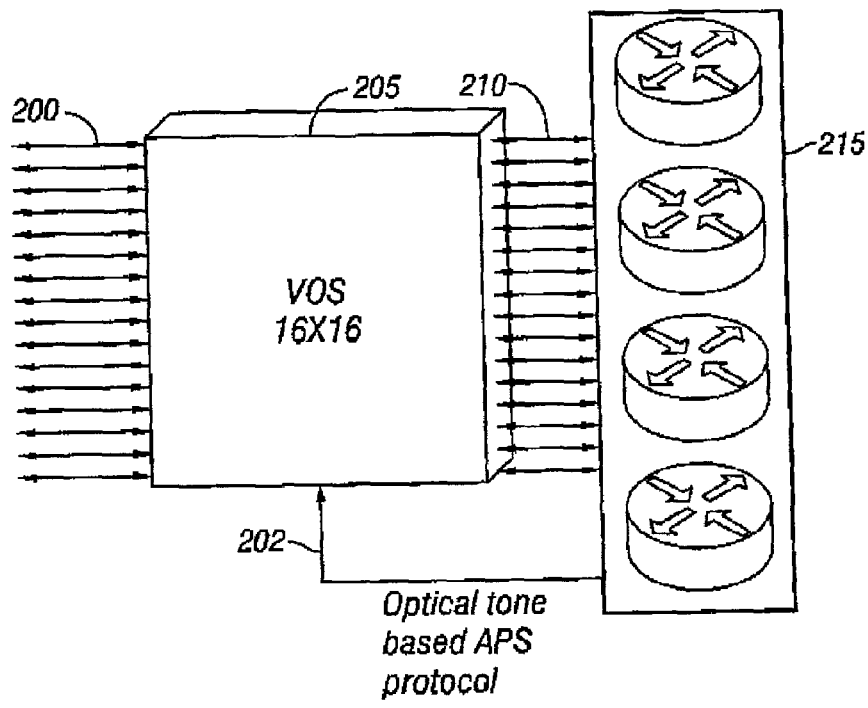
FIG. 2 shows how a similar system can be carried out using an optical system with an optical tone, and that may return information about the router.

A second embodiment is shown in FIG. 2. This setting embodiment carries out a similar functionality using an all optical network.

Optical input signals 200 are connected to an optical switch 205 which may be an optical switch of the type capable of connecting any input signal to any output signal. Since the system is all optical, it can operate without the transceivers that are necessary in the first embodiment. The output signals 210 are connected to the routers shown as 215, with again blocks of four signals being connected to each router. An existing 16 by 16 switch is shown as being used as the switch 205. This switch has the capability to send any of the 16 inputs to any of its outputs. However, it may be possible to use different sized switches. For example, 2, 8×8 switches may be used instead, which will allow less switching redundancy, since each one input 200 will only be switchable to one of eight different outputs 210. An important part of this system is that, the transceivers 102,112 shown in FIG. 1 are no longer necessary since the system is all optical. This may prove to be a significant cost savings.

However, in the system shown in FIG. 2, it may still be necessary for the routers 215 to provide information back to the switch 205. Otherwise, the switch 205 will not be able to determine error information in the routers 215. A signaling system may be used in the optical domain to carry out this operation. The signaling may occur over a line 202 or alternatively maybe the standard SONET/SDA signaling.

Figure 3:
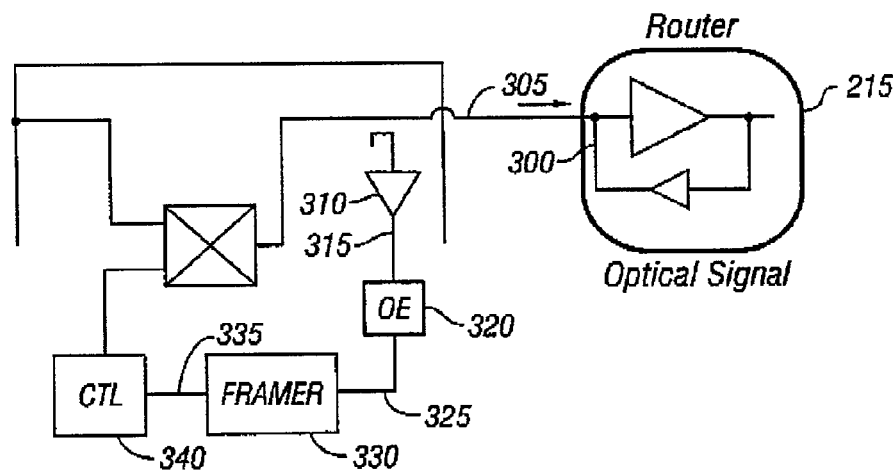
FIG. 3 shows further details on the optical switch and how it processes the optical tones.

A first embodiment of the signaling system is shown in FIG. 3. In this system, the routers such as 215 place an optical signal shown as 300 on their optical line. The optical signal travels back towards the switch. The line 300 is monitored by an element 310 which may obtain a sample of the optical signal, the sample may represent 5 to 10 percent of the optical power in the line 300. The sample 315 is coupled to an optical to electrical converter 320, which converts the signal to an electrical signal 325. The electrical signal 325 is then framed by a framer 330 and output. The output 335 represents similar information to that in the K1, K2 bits and is coupled to the control circuitry 340 within the optical switch 205. In this way, each router input and output may receive optical switch information.

A second embodiment defines the failure information using an optical tone system. In this embodiment, a serial bit sequence may be added to the optical signal 305 traveling to the router 215. The signal may be amplitude modulated over the digital signal; e.g. as a 5 percent amplitude variation. The signal may be a specific tone signal, on the order of 2 MHz, with a specific tone frequency assigned to each wavelength. The signal may represent the information in the K1, K2 bits. For example, these serial bits sequence may be defined as a frame of 10 consecutive bytes, including two framing bytes. After transmitting and receiving the frame, the next frame may be transmitted and received. The framing bytes delineate the frame, within which is contained the information.

Figure 4:
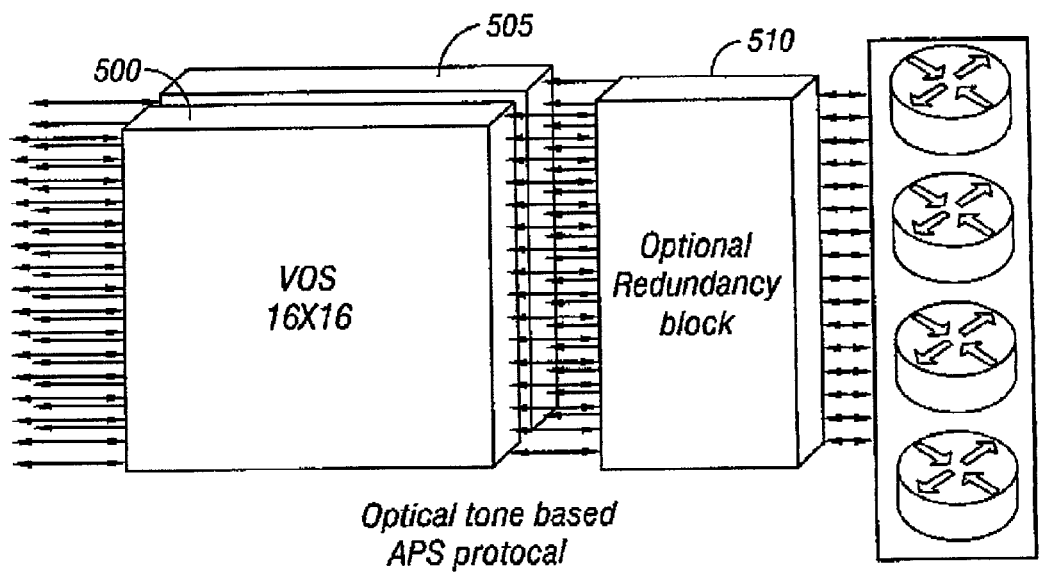
FIG. 4 shows a 100 percent redundant optical system.

The outgoing transmitted signal includes a tone on the order of 2 MHz, but each specific tone frequency represents a specific wavelength among the channels. The system can therefore extract the tone in the presence of multiple signals, and extract amplitude modulation information that is superimposed on the tones. The system may then process the messages per application. Since each wavelength has a slightly different tone modulation frequency, when the tone is detected, the wavelength is correspondingly detected. Another embodiment, shown in FIG. 4, may provide an optional redundancy block in the optical switch. In this embodiment, two different optical switches 500,505 each receive the operation signals, and provide their outputs to the redundancy block 510. An error or fault in either optical switch 500,505 will still be corrected by the redundancy.

Other embodiments are possible based on the disclosed embodiment.

What is claimed is:

1. A signal switching system, comprising:
   a signal switching part, receiving a plurality of inputs and switching any of said plurality of inputs to any of a plurality of outputs, said switching part including a control mechanism;
   an optical router, receiving said signals from said outputs, and optically routing said signals, said optical router produces a fault signal; and
   an optical sampling element having an optical to electrical converter element and a framer element, the optical sampling element configured to sample said signals and produce a sample indicative of said fault signal which is used by said control mechanism to control said switching.

2. The signal switching system as in claim 1, wherein said signal switching part includes n by n switch having n channels, and wherein at least a plurality of said n channels are redundancy channels.

3. The signal switching system as in claim 1, wherein said signal switching part includes an optical switch having optical lines.

4. The signal switching system as in claim 3 wherein said signals switching part includes a 16 ×16 optical switch.

5. The signal switching system as in claim 3, wherein said signal switching system includes an 8 by 8 optical switch.

6. The system as in claim 3, wherein said optical switch includes an optical detecting element, which detects a signal on one of said optical lines.

7. The system as in claim 6, wherein said signal is formed as an amplitude modulated signal on said optical lines.

8. A method, comprising:
   sending a plurality of channels to a plurality of routers;
   providing an optical signal from said routers;
   sampling a portion of said optical signal to determine an error in said routers;
   converting said sampled optical signal to an electrical signal; and
   framing the electrical signal, whereby said framed electrical signal is used to control the sending of the plurality of channels.

9. The method as in claim 8, wherein said optical signal is provided as a modulation on at least one of said plurality of channels.

10. The method as in claim 9, wherein said modulation is an amplitude modulation.

11. The method as in claim 8, wherein said optical signal is an amplitude modulated signal.

12. The method as in claim 11, wherein said signal includes information indicative of a frequency of said error.

13. The method as in claim 8, wherein the plurality of routers have spare capability for failed routers.

14. A system, comprising:
   an all optical switch, capable of switching any of a plurality of inputs to any of a plurality of outputs, said switch including a control mechanism which controls said switching and an optical sampling element having an optical to electrical converter element and a framer element; and
   a router array, producing an optical error signal indicative of errors in said router array, said optical error signal being coupled to said optical switch and being used by said control mechanism, wherein said optical error signal is modulated on one of said outputs and the optical sampling element produces a sample indicative of said optical error signal.

15. A system, comprising:
   an all optical switch, capable of switching any of a plurality of inputs to any of a plurality of outputs, said switch including a control mechanism which controls said switching and an optical sampling element, wherein said control mechanism operates based on electrical signals and said optical sampling element includes an optical to electrical converter element, and a framer element, producing an electrical signal which is used by said control mechanism; and
   a router array, producing an optical error signal indicative of errors in said router array, said optical error signal being coupled to said optical switch and being used by said control mechanism, wherein said optical error signal is modulated on one of said outputs.

16. The system as in claim 15, wherein said optical switch is an n by n switch which can switch any of its n inputs to any of its n outputs, based on said control mechanism.

17. The system as in claim 16, wherein said optical switch is a 16 by 16 switch.

18. The system as in claim 15, wherein said optical switch includes two, 8 by 8 switches.

19. A method, comprising:
   carrying out all optical switching between a plurality of optical channels and a plurality of routers; and
   providing signaling from said plurality of routers to effect said optical switching, wherein said signaling comprises determining errors in said routers, and producing signals indicative of said errors by inducing a signal on one of said optical channels, wherein said inducing comprises adding an indication of a channel number to said signal indicative of said errors.

* * * * *